United States Patent
Zhao

(10) Patent No.: US 9,927,647 B2
(45) Date of Patent: Mar. 27, 2018

(54) SUBSTRATE OF TOUCH DISPLAY SCREEN AND METHOD OF FABRICATING THE SAME, TOUCH SCREEN AND DISPLAY DEVICE

(71) Applicant: BOE TECHNOLOGY GROUP CO., LTD., Beijing (CN)

(72) Inventor: Lijun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/325,146

(22) PCT Filed: Nov. 17, 2015

(86) PCT No.: PCT/CN2015/094752
§ 371 (c)(1),
(2) Date: Jan. 10, 2017

(87) PCT Pub. No.: WO2016/107310
PCT Pub. Date: Jul. 7, 2016

(65) Prior Publication Data
US 2017/0184896 A1    Jun. 29, 2017

(30) Foreign Application Priority Data

Dec. 31, 2014    (CN) .......................... 2014 1 0855010

(51) Int. Cl.
*G02F 1/133*    (2006.01)
*G06F 3/044*    (2006.01)
(Continued)

(52) U.S. Cl.
CPC ........ *G02F 1/13338* (2013.01); *G02F 1/1368* (2013.01); *G02F 1/13439* (2013.01);
(Continued)

(58) Field of Classification Search
CPC ............ G02F 1/13338; G02F 1/134309; G02F 1/1368; G02F 1/136286; G02F 1/13439;
(Continued)

(56) References Cited

U.S. PATENT DOCUMENTS

2012/0068200 A1* 3/2012 Oh .................... G02F 1/136227
257/88
2012/0069257 A1* 3/2012 Oh ...................... G02F 1/13338
349/42

(Continued)

FOREIGN PATENT DOCUMENTS

CN    102841717 A    12/2012
CN    103092452 A    5/2013
(Continued)

OTHER PUBLICATIONS

International Search Report dated Feb. 18, 2016 issued in corresponding International Application No. PCT/CN2015/094752 along with English translation of Written Opinion of the International Searching Authority.
(Continued)

*Primary Examiner* — Ariel Balaoing
(74) *Attorney, Agent, or Firm* — Nath, Goldberg & Meyer; Joshua B. Goldberg

(57) ABSTRACT

The present invention discloses a substrate of a touch display screen and a method of fabricating the same, a touch screen and a display device. The substrate includes a base substrate and a layer of electrode layer provided on the base substrate, the electrode layer includes a plurality of first electrodes and a plurality of third electrodes, which intersect with and are electrically insulated from each other; wherein, the first electrodes and the third electrodes input a common electrode signal, when the first electrodes and the third electrodes are at a first time period with image display; and the third electrodes and a part of the first electrodes input a
(Continued)

touch control signal, when the first electrodes and the third electrodes are at a second time period without image display. In the above technical solution, a touch receiving electrode and a touch transmitting electrode can be provided in a same layer, and when a common electrode is formed on the substrate, the touch transmitting electrode and the touch receiving electrode may be formed on the formed common electrode. The structure of the substrate is simplified, the production processes of the substrate are reduced, and fabrication costs of the substrate are lowered.

16 Claims, 2 Drawing Sheets

(51) Int. Cl.
  *G06F 3/041* (2006.01)
  *G02F 1/1333* (2006.01)
  *G02F 1/1343* (2006.01)
  *G02F 1/1362* (2006.01)
  *G02F 1/1368* (2006.01)

(52) U.S. Cl.
  CPC .. *G02F 1/134309* (2013.01); *G02F 1/136286* (2013.01); *G06F 3/044* (2013.01); *G06F 3/0412* (2013.01); *G06F 3/0416* (2013.01); *G02F 2201/121* (2013.01); *G02F 2201/123* (2013.01); *G06F 2203/04103* (2013.01)

(58) Field of Classification Search
  CPC ........ G02F 1/2201; G02F 1/123; G02F 1/121; G06F 3/044; G06F 3/0416
  See application file for complete search history.

(56) References Cited

U.S. PATENT DOCUMENTS

| | | | |
|---|---|---|---|
| 2013/0286300 A1* | 10/2013 | Lee | G02F 1/13306 349/12 |
| 2013/0335822 A1 | 12/2013 | Yeh et al. | |
| 2014/0267950 A1 | 9/2014 | Kang et al. | |
| 2014/0333582 A1* | 11/2014 | Huo | G02F 1/13338 345/174 |
| 2015/0077370 A1* | 3/2015 | Kim | G06F 3/0416 345/173 |

FOREIGN PATENT DOCUMENTS

| | | |
|---|---|---|
| CN | 103135815 A | 6/2013 |
| CN | 203117953 U | 8/2013 |
| CN | 203376696 U | 1/2014 |
| CN | 103699284 A | 4/2014 |
| CN | 103885637 A | 6/2014 |
| CN | 103955320 A | 7/2014 |
| CN | 104020891 A | 9/2014 |
| CN | 104035640 A | 9/2014 |
| CN | 104199580 A | 12/2014 |
| CN | 104216564 A | 12/2014 |
| CN | 104216578 A | 12/2014 |
| CN | 104238854 A | 12/2014 |
| CN | 104503647 A | 4/2015 |
| CN | 204515743 U | 7/2015 |

OTHER PUBLICATIONS

First Office Action dated Jan. 24, 2017 in corresponding Chinese Application No. 201410855010.3.

* cited by examiner

SUBSTRATE OF TOUCH DISPLAY SCREEN AND METHOD OF FABRICATING THE SAME, TOUCH SCREEN AND DISPLAY DEVICE

This is a National Phase Application filed under 35 U.S.C. 371 as a national stage of PCT/CN2015/094752, filed Nov. 17, 2015, an application claiming the benefit of Chinese Application No. 201410855010.3, filed Dec. 31, 2014, the content of each of which is hereby incorporated by reference in its entirety.

TECHNICAL FIELD

The present invention relates to the technical field of display devices, and particularly relates to a substrate of a touch display screen and a method of fabricating the same, a touch screen and a display device.

BACKGROUND

With the rapid development of display technology, touch screens have extended all over in people's life. Currently, the touch screens can be divided into resistive touch screens, capacitive touch screens, infrared touch screens and surface acoustic wave touch screens, according to their working principles. Among others, the capacitive touch screens are widely used in the industry due to their capability of achieving true multi-point control and high sensitivity.

The capacitive touch screens can be divided into add-on touch screens, on-cell touch screens and in-cell touch screens according to their composition structures. Among others, the add-on touch screen is formed in such a manner that a touch screen and a display screen are manufactured separately, and are then bonded together to form a liquid crystal display screen with a touch control function. The add-on touch screens have disadvantages such as high production costs, low light transmittance, thick modules, etc. Whereas, for the in-cell touch screen, a touch electrode of the touch screen is embedded inside the liquid crystal display screen, which can not only reduce an overall thickness of the modules, but also greatly lower fabrication costs of the touch screen. Thus, the in-cell touch screens have gained popularity among major panel manufacturers.

At present, the shortcoming of the prior art lies in that, in an existing capacitive screen, layered layout is adopted, i.e., a touch transmitting electrode and a touch receiving electrode are provided in different layers, respectively, which results in a relatively complex structure of the touch screen and increased difficulty in production of a touch substrate.

SUMMARY

The present invention provides a substrate of a touch display screen, a touch screen and a display device, for the purpose of simplifying the structure of the touch screen and lowering the costs of the touch screen.

The present invention provides a substrate of a touch display screen, comprising a base substrate and a layer of electrode layer provided on the base substrate, the electrode layer comprising a plurality of first electrodes and a plurality of third electrodes, which intersect with and are electrically insulated from each other;

wherein, the first electrodes and the third electrodes input a common electrode signal, when the first electrodes and the third electrodes are at a first time period with image display; and the third electrodes and a part of the first electrodes input a touch control signal, when the first electrodes and the third electrodes are at a second time period without image display.

In the above technical solution, electrodes are provided on the base substrate, and among the electrodes, the first electrodes serve as the common electrode and the touch receiving electrode, the third electrodes serve as the common electrode and the touch transmitting electrode, coupling capacitors are formed by means of connecting lines and the electrode connecting layer, and the first electrodes and the third electrodes are driven in a time division manner. As a result, the touch receiving electrode and the touch transmitting electrode may be provided in a same layer. In fabrication, after a common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered.

Preferably, the plurality of first electrodes are arranged in parallel, each first electrode is separated by the third electrodes into a plurality of electrode segments; the electrode segments of each first electrode are connected into a whole by an electrode connecting layer provided in a different layer, and a projection of the electrode connecting layer on the base substrate intersects with the third electrodes.

Preferably, the electrode connecting layer and a pixel electrode on the substrate of a touch display screen are provided in a same layer.

Preferably, the substrate further comprises a protection layer provided on a thin film transistor of the substrate, the electrode connecting layer being provided on the protection layer.

Preferably, through holes are provided in the protection layer, and the electrode connecting layer passes through the through holes to connect to the plurality of electrode segments of the first electrode.

Preferably, the third electrode comprises a plurality of electrode segments, any two adjacent electrode segments of the third electrode are located on two sides of the first electrode, respectively, adjacent electrode segments are connected by a connecting line, and a projection of the electrode connecting layer on the base substrate intersects with the connection line.

Preferably, the connecting line and the gate line are made of a same material.

Preferably, the connecting line has a width ranging from 2 μm to 15 μm.

Preferably, the first electrodes and the second electrodes are provided in a same layer as a gate of the substrate.

Preferably, the electrode segments of the first electrode and the electrode segments of the third electrode are all transparent electrode segments.

Preferably, the plurality of first electrodes further comprise a plurality of second electrodes and a plurality of fourth electrodes, the plurality of second electrodes and the plurality of fourth electrodes are provided at an interval, the plurality of second electrodes input the common electrode signal only, and the plurality of fourth electrodes input the touch control signal in the second period.

The present invention further provides a method of fabricating a substrate of a touch display screen, comprising a step of:

forming a layer of electrode layer on a base substrate by a patterning process, the electrode layer comprising first electrodes and third electrodes, the first electrodes and the third electrodes intersecting with and being electrically insulated from each other.

In the above technical solution, the first electrodes and the third electrodes are formed in a same layer, and can serve as touch control electrodes, and when a common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered.

Preferably, forming a layer of electrode layer, which comprises the first electrodes and the third electrodes intersecting with and being electrically insulated from each other, on a base substrate specifically comprises:

forming, by a single patterning process, electrode segments of a plurality of first electrodes arranged in parallel and electrode segments of third electrodes intersecting with the first electrodes by etching the formed electrode layer;

forming, by a single patterning process, connecting lines which connect the electrode segments of the third electrode; and forming, by a single patterning process, an electrode connecting layer, a projection of the electrode connecting layer on the base substrate intersecting with the third electrodes.

Preferably, forming, by a single patterning process, connecting lines which connect the electrode segments of the third electrode specifically comprises:

forming, by a single patterning process, a gate and the connecting lines which connect the electrode segments of the third electrode.

Preferably, forming, by a single patterning process, an electrode connecting layer specifically comprises: forming, by a single patterning process, a pixel electrode and the electrode connecting layer, a projection of the electrode connecting layer on the base substrate intersecting with the third electrodes.

Preferably, before forming the electrode connecting layer, the method further comprises:

forming a protection layer on a formed thin film transistor, and forming through holes corresponding to the electrode segments of the first electrodes in the protection layer.

The present invention further provides a touch screen, comprising any one of the above substrates.

In the above technical solution, electrodes are provided on the base substrate, and among the electrodes, the first electrodes serve as the common electrode and the touch receiving electrode, the third electrodes serve as the common electrode and the touch transmitting electrode, coupling capacitors are formed by means of connecting lines and the electrode connecting layer, and the first electrodes and the third electrodes are driven in a time division manner. As a result, the touch receiving electrode and the touch transmitting electrode may be provided in a same layer. In fabrication, after a common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered.

The present invention further provides a display device comprising the above touch screen.

In the above technical solution, electrodes are provided on the base substrate, and among the electrodes, the first electrodes serve as the common electrode and the touch receiving electrode, the third electrodes serve as the common electrode and the touch transmitting electrode, coupling capacitors are formed by means of connecting lines and the electrode connecting layer, and the first electrodes and the third electrodes are driven in a time division manner. As a result, the touch receiving electrode and the touch transmitting electrode may be provided in a same layer. In fabrication, after a common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered.

Figure 1:
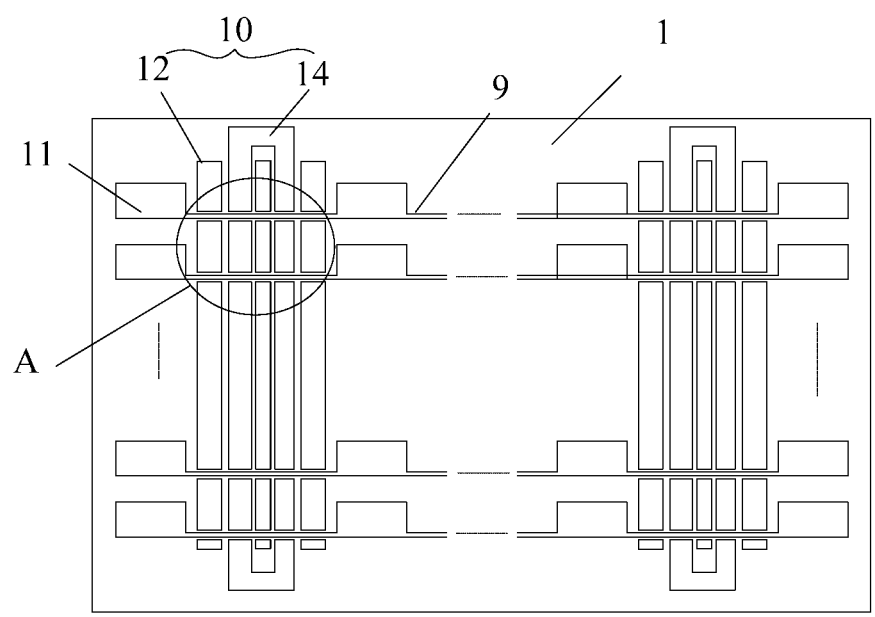
FIG. 1 is a top view of a substrate of a touch display screen provided in an embodiment of the present invention.

| Reference Numerals: | | |
|---|---|---|
| 1-base substrate | 2-gate | 3-gate insulation layer |
| 4-active layer | 5-source | 6-protection layer |
| 7-drain | 8-pixel electrode | 9-connecting line |
| 10-first electrode | 11-third electrode | 12-second electrode |
| 13-electrode connecting layer | 14-fourth electrode | |

DETAILED DESCRIPTION

In order to simplify the structure of a touch screen and reduce costs of the touch screen, embodiments of the present invention provide a substrate of a touch display screen and a method of fabricating the same, a touch screen and a display device. In the technical solutions of the present invention, since a touch transmitting electrode and a touch receiving electrode share with a common electrode, respectively, the touch transmitting electrode and the touch receiving electrode are provided in a same layer, which reduces the number of layers of the substrate to be fabricated, further simplify the structure of the substrate and lower the costs of the touch screen. To make objects, technical solutions and advantages of the present invention clearer, the present invention will be further described in detail below in conjunction with some of the embodiments.

Figure 2:
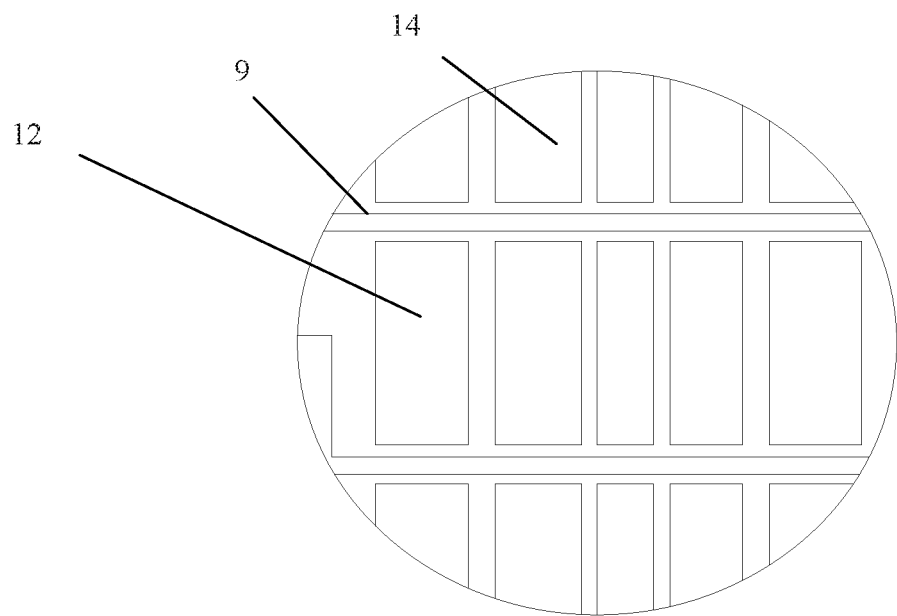
FIG. 2 is a partial enlarged view of portion A in FIG. 1.

As shown in FIGS. 1 and 2, FIG. 1 is a top view of a substrate of a touch display screen provided in an embodiment of the present invention; FIG. 2 is a partial enlarged view of portion A in FIG. 1

An embodiment of the present invention provides a substrate of a touch display screen, which includes a base substrate 1 and a layer of electrode layer provided on the base substrate 1, the electrode layer includes a plurality of first electrodes 10 and a plurality of third electrodes 11, which intersect with and are electrically insulated from each other;

the first electrodes 10 and the third electrodes 11 input a common electrode signal, when the first electrodes 10 and the third electrodes 11 are at a first time period with image display; and the third electrodes 11 and a part of the first electrodes 10 input a touch control signal in part of a second time period without image display, when the first electrodes 10 and the third electrodes 11 are at the second time period.

In the above specific embodiment, electrodes are provided on the base substrate, particularly, the first electrodes 10 serve as a common electrode and a touch receiving electrode, the third electrodes 11 serve as the common electrode and a touch transmitting electrode, coupling capacitors are formed by means of connecting lines 9 and an electrode connecting layer 13, and the first electrodes 10 and the third electrodes 11 are driven in a time division manner. As a result, the touch receiving electrode and the touch transmitting electrode may be provided in a same layer. In fabrication, after a common electrode is formed on the substrate, a touch transmitting electrode and a touch receiving electrode may be formed on the formed common electrode. In this way, the structure of the substrate is simplified, the production processes of the substrate are reduced, and fabrication costs of the substrate are lowered. When an operator touches the touch screen, capacitance of the coupling capacitor formed between the electrode connecting layer 13 and the touch receiving electrode is affected, thus the capacitance of the coupling capacitor at the touch position of the operator becomes different from that of the coupling capacitor at other position, and the touch screen determines the touch position of the operator based on the received position of the coupling capacitor with changed capacitance.

Furthermore, the substrate may be an array substrate or a color filter substrate, and preferably, the substrate is an array substrate. Each thin film transistor on the substrate specifically includes: a gate 2 provided on the base substrate 1; a gate insulation layer 3 provided on the gate 2; an active layer 4 provided on the gate insulation layer 3; a source 5 and a drain 7 provided on the active layer 4. Thus, a structure for controlling deflection of liquid crystal molecules of a liquid crystal layer in a pixel unit is formed. More preferably, each thin film transistor further includes a protection layer 6 provided on the gate 2 and the drain 7, for the purpose of better protecting the structures on the substrate and preventing the structures on the substrate from being damaged in the process of fabrication.

To facilitate understanding of the substrate provided by the embodiment of the present invention, the structure thereof is described in detail below in conjunction with FIGS. 1-5.

Continuing with reference to FIGS. 1 and 2, the number of the first electrodes 10 is plural, the plurality of first electrodes 10 are arranged in parallel, each of the first electrodes 10 is separated into a plurality of electrode segments by the third electrodes 11; the electrode segments of each first electrode 10 are connected into a whole by the electrode connecting layer 13 provided in a different layer, and a projection of the electrode connecting layer 13 on the base substrate 1 intersects with the third electrodes 11. The electrode connecting layer 13 and the pixel electrode 8 are provided in a same layer, specifically, the pixel electrode 8 and the electrode connecting layer 13 are provided on the protection layer 9. Moreover, in fabrication, the pixel electrode 8 and the electrode connecting layer 13 are formed simultaneously, no additional fabrication process is needed, and thus the fabrication of the substrate is facilitated.

Continuing with reference to FIG. 1, it can be seen from FIG. 1 that the third electrode 11 includes a plurality of electrode segments, any two adjacent electrode segments of the third electrode 11 are located on two sides of the first electrode 10, respectively, the adjacent electrode segments are connected by the connecting line 9, and a projection of the electrode connecting layer 13 on the base substrate 1 intersects with the connection line 9. Referring together with FIG. 2, it can be seen from FIG. 2 that, there is a gap between the connecting line 9 and the first electrode 10, which guarantees electrical isolation between the first electrode 10 and the third electrode 11. In specific fabrication, electrode segments of the first electrode 10 and electrode segments of the third electrode 11 are formed on the base substrate 1, afterwards, the connecting line 9 is formed while the gate 2 is formed, that is, the gate 2 and the connecting line 9 are provided in a same layer, and the connecting line 9 and the gate 2 are made of a same material. In this way, no additional process is needed to form the connecting line 9, which simplifies the fabrication method of the substrate. In specific fabrication, the connecting line 9 has a width ranging from 2 μm to 15 μm.

Continuing with reference to FIG. 1, the above first electrodes 10 includes second electrodes 12 and fourth electrodes 14 arranged in parallel, the second electrodes 12 and the fourth electrodes 14 are provided at an interval, the second electrodes 12 input the common electrode signal only, the fourth electrodes 14 input a touch control signal in the second time period, i.e., the second electrodes 12 serve as the common electrode, and each of the second electrodes 12 is separated into a plurality of electrode segments by the third electrodes 11; the electrode segments of each second electrode 12 are connected into a whole by the electrode connecting layer 13. The second electrodes 12 serve as a pure common electrode, in this case, there are three types of electrodes provided on the base substrate 1: the first one is the fourth electrodes 14, which can serve as both the common electrode and the touch receiving electrode; the second one is the second electrodes 12, which serve as the common electrode; the third one is the third electrodes 11, which can serve as both the common electrode and the touch transmitting electrode.

Figure 3:
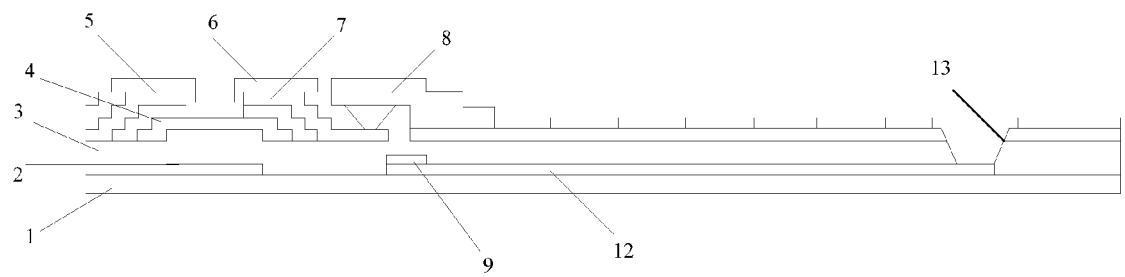
FIG. 3 is a cross-sectional view at a third electrode of a substrate of a touch display screen provided in an embodiment of the present invention.
Figure 4:
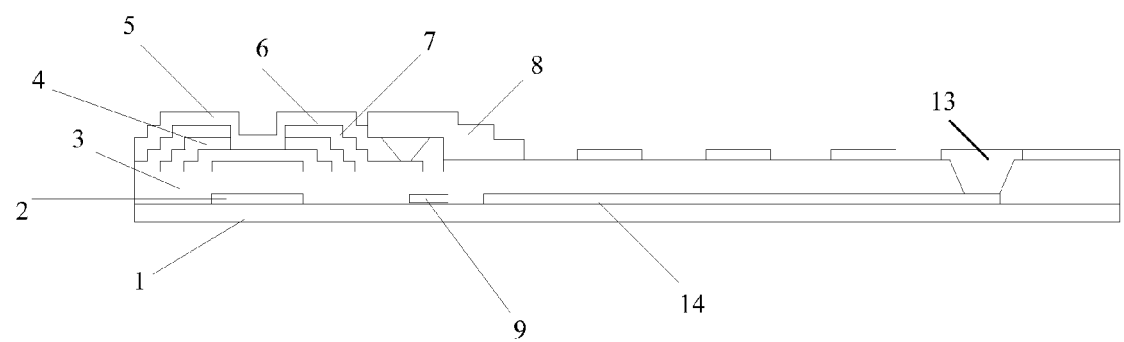
FIG. 4 is a cross-sectional view at a second electrode of a substrate of a touch display screen provided in an embodiment of the present invention.
Figure 5:
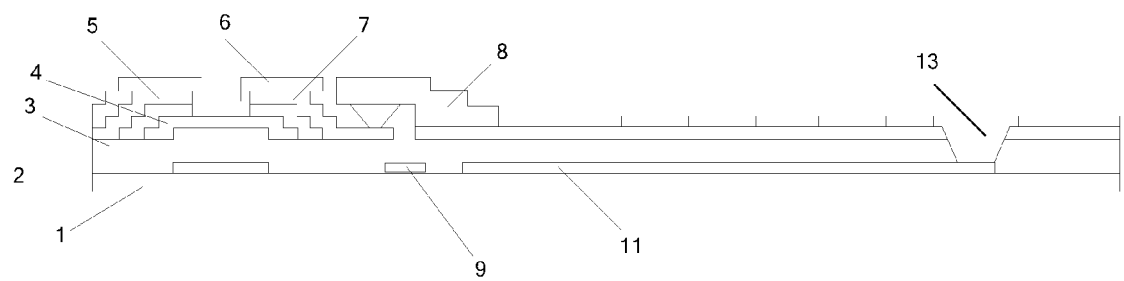
FIG. 5 is a cross-sectional view at a first electrode of a substrate of a touch display screen provided in an embodiment of the present invention.

Referring to FIGS. 3 to 5 together, the first electrodes 10 and the third electrodes 11 are made of a transparent electrode material, that is, the electrode segments of the first electrode 10 and the electrode segments of the third electrode 11 are all transparent electrode segments.

In fabrication of the substrate, the provided electrode connecting layer 13 is located on the protection layer 6. A through hole is provided in the protection layer 13, and the electrode connecting layer passes through the through hole to connect with the plurality of electrode segments of the first electrode. Specifically, in fabrication, three types of through holes are formed in the gate insulation layer 3 and the protection layer 6 formed on the substrate, the first type of through hole is used for connecting the electrodes (the third electrodes 11) serving as both the common electrode and the touch transmitting electrode, the second type of through hole is used for connecting the electrodes (the fourth electrodes 14) serving as both the common electrode and the touch receiving electrode, and the third type of through hole is used for connecting the separately used common electrodes (the second electrodes 12). When forming the electrode connecting layer 13 on the protection layer 6, the electrode connecting layer 13 connects the electrode segments of the fourth electrode 14, connects the electrode segments of the second electrode 12 and connects adjacent third electrodes 11.

To facilitate understanding the embodiments of the present invention, the substrate will be described in detail below in conjunction with a fabrication method thereof.

The present invention further provides a method of fabricating a substrate of a touch display screen, including the following step:

forming a layer of electrode layer on a base substrate by a patterning process, the electrode layer including first electrodes 10 and third electrodes 11, the first electrodes 10 and the third electrodes 11 intersecting with and being electrically insulated from each other.

Forming a thin film transistor on the base substrate 1 specifically includes: forming, by a single patterning process, electrode segments of a plurality of first electrodes arranged in parallel and electrode segments of the third electrodes intersecting with the first electrodes by etching the formed electrode layer;

forming, by a single patterning process, connecting lines which connect the electrode segments of the third electrode; specifically, forming, by a single patterning process, a gate and connecting lines which connect the electrode segments of the third electrode; and forming, by a single patterning process, an electrode connecting layer, a projection of the electrode connecting layer on the base substrate intersecting with the third electrodes; specifically, forming, by a single patterning process, the pixel electrode and the electrode connecting layer, a projection of the electrode connecting layer on the base substrate intersecting with the third electrodes.

In addition, before forming the electrode connecting layer, the method further includes forming a protection layer on the formed thin film transistor, and forming through holes corresponding to electrode segments of the first electrode in the protection layer.

To facilitate understanding, detailed description will be given below in conjunction with FIGS. 3 to 5. FIG. 3 is a cross-sectional view at a third electrode of a substrate of a touch display screen provided in an embodiment of the present invention; FIG. 4 is a cross-sectional view at a second electrode of a substrate of a touch display screen provided in an embodiment of the present invention; and FIG. 5 is a cross-sectional view at a first electrode of a substrate of a touch display screen provided in an embodiment of the present invention.

At step 1, a TFT substrate is provided, an ITO layer is deposited on a surface of the TFT substrate, and is patterned by using lithography technology to form second electrodes 12 (common electrode Vcom), fourth electrodes 14 (common electrode/touch receiving electrode Vcom/Rx) and first electrodes 11 (common electrode/touch transmitting electrode Vcom/Tx).

At step 2, a metal layer is deposited thereon, and is patterned by using lithography technology to form a gate 2 (Gate), and a connecting line 9 (Tx), which is connected to the previously-formed third electrodes 11 (Vcom/Tx) and spaced apart from the second electrodes (Vcom) and the fourth electrodes 14 (Vcom/Rx) by a certain gap.

At step 3, a gate insulation layer 3 (GI) is deposited on the formed gate 2.

At step 4, a semiconductor layer (i.e., an active layer 4), which may include an amorphous silicon layer (Active) and a lightly doped amorphous silicon layer (n+), is deposited on the gate insulation layer 3, then a second metal layer (SD) is deposited thereon, and the semiconductor layer and the second metal layer are patterned by lithography technology to form a thin film transistor channel, a source 5 (S), a drain 7 (D), and a data line (D).

At step 5, a protection layer 6 is deposited thereon, and is patterned by using lithography technology to form a connecting hole for a pixel electrode 8, a connecting hole for the touch transmitting electrode, a connecting hole for the touch receiving electrode and a connecting hole for the common electrode.

At step 6, an ITO layer is deposited thereon, and the pixel electrode 8 and the electrode connecting layer 13 are patterned by using lithography technology.

An embodiment of the present invention further provides a touch screen, which includes any one of the substrates described above.

In the specific embodiments described above, electrodes are provided on the base substrate, and particularly, among the electrodes, the fourth electrodes 14 serve as the common electrode and the touch receiving electrode, the third electrodes 11 serve as the common electrode and the touch transmitting electrode, coupling capacitors are formed by means of the connecting lines 9 and the electrode connecting layer 13, and the fourth electrodes 14 and the third electrodes 11 are driven in a time division manner. As a result, the touch receiving electrode and the touch transmitting electrode may be provided in a same layer. In fabrication, after the common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered. When an operator touches the touch screen, capacitance of the coupling capacitor formed between the electrode connecting layer 13 and the touch receiving electrode is affected, thus the capacitance of the coupling capacitor at the touch position of the operator becomes different from that of the coupling capacitor at other position, and the touch screen determines the touch position of the operator based on the received position of the coupling capacitor with changed capacitance.

An embodiment of the present invention further provides a display device, which includes the touch screen described above.

In the specific embodiments described above, electrodes are provided on the base substrate, particularly, among the electrodes, the fourth electrodes 14 serve as the common electrode and the touch receiving electrode, the third electrodes 11 serve as the common electrode and the touch transmitting electrode, coupling capacitors are formed by means of the connecting lines 9 and the electrode connecting layer 13, and the fourth electrodes 14 and the third electrodes 11 are driven in a time division manner. As a result, the touch receiving electrode and the touch transmitting electrode may be provided in a same layer. In fabrication, after the common electrode is formed on the substrate, the touch transmitting electrode and the touch receiving electrode may be formed on the formed common electrode. In this way, the structure of the substrate is simplified, the production processes of the substrate are reduced, and fabrication costs of the substrate are lowered. When an operator touches the touch screen, capacitance of the coupling capacitor formed between the electrode connecting layer 13 and the touch receiving electrode is affected, thus the capacitance of the coupling capacitor at the touch position of the operator becomes different from that of the coupling capacitor at other position, and the touch screen determines the touch position of the operator based on the received position of the coupling capacitor with changed capacitance.

Apparently, a person skilled in the art can make various modifications and variations to the present invention without departing from the spirit and scope of the present invention. As thus, if these modifications and variations of the present invention are within the scope of the present claims and equivalents thereof, the present invention intends to encompass these modifications and variations.

The invention claimed is:

1. A substrate of a touch display screen, comprising a base substrate and a layer of electrode layer provided on the base substrate, the electrode layer comprising a plurality of first electrodes and a plurality of third electrodes, which intersect with and are electrically insulated from each other;
   wherein, the first electrodes and the third electrodes input a common electrode signal, when the first electrodes and the third electrodes are at a first time period with image display;
   the third electrodes and a part of the first electrodes input a touch control signal, when the first electrodes and the third electrodes are at a second time period without image display; and
   the plurality of first electrodes further comprise a plurality of second electrodes and a plurality of fourth electrodes, the plurality of second electrodes and the plurality of fourth electrodes are provided at an interval, the plurality of second electrodes input the common electrode signal only, and the plurality of fourth electrodes input the touch control signal in the second time period.

2. The substrate of a touch display screen according to claim 1, wherein, the plurality of first electrodes are arranged in parallel, each first electrode is separated by the third electrodes into a plurality of electrode segments; the electrode segments of each first electrode are connected into a whole by an electrode connecting layer provided in a different layer from the first electrode, and a projection of the electrode connecting layer on the base substrate intersects with the third electrodes.

3. The substrate of a touch display screen according to claim 2, wherein, the electrode connecting layer and a pixel electrode on the substrate of a touch display screen are provided in a same layer.

4. The substrate of a touch display screen according to claim 3, further comprising a protection layer provided on a thin film transistor of the substrate, the electrode connecting layer being provided on the protection layer.

5. The substrate of a touch display screen according to claim 4, wherein, through holes are provided in the protection layer, and the electrode connecting layer passes through the through holes to connect to the plurality of electrode segments of the first electrode.

6. The substrate of a touch display screen according to claim 2, wherein, the third electrode comprises a plurality of electrode segments, any two adjacent electrode segments of the third electrode are located on two sides of the first electrode, respectively, adjacent electrode segments are connected by a connecting line, and a projection of the electrode connecting layer on the base substrate intersects with the connection line.

7. The substrate of a touch display screen according to claim 6, wherein, the connecting line and the gate line are made of a same material.

8. The substrate of a touch display screen according to claim 6, wherein, the connecting line has a width ranging from 2 μm to 15 μm.

9. The substrate of a touch display screen according to claim 6, wherein, the connecting line is provided in a same layer as a gate of the substrate.

10. The substrate of a touch display screen according to claim 9, wherein, the electrode segments of the first electrode and the electrode segments of the third electrode are all transparent electrode segments.

11. A touch screen, comprising the substrate according to claim 1.

12. A method of fabricating a substrate of a touch display screen, comprising a step of:
   forming a layer of electrode layer on a base substrate by a patterning process, the electrode layer comprising first electrodes and third electrodes, the first electrodes and the third electrodes intersecting with and being electrically insulated from each other, wherein the first electrodes comprise a plurality of second electrodes and a plurality of fourth electrodes, the plurality of second electrodes and the plurality of fourth electrodes are provided at an interval, the plurality of second electrodes configured to input a common electrode signal only, and the plurality of fourth electrodes configured to input a touch control signal in a second time period.

13. The method according to claim 12, wherein, forming a layer of electrode layer, which comprises the first electrodes and the third electrodes intersecting with and being electrically insulated from each other, on a base substrate specifically comprises:
   forming, by a single patterning process, electrode segments of a plurality of first electrodes arranged in parallel and electrode segments of third electrodes intersecting with the first electrodes by etching the formed electrode layer;
   forming, by a single patterning process, connecting lines which connect the electrode segments of the third electrode; and
   forming, by a single patterning process, an electrode connecting layer, a projection of the electrode connecting layer on the base substrate intersecting with the third electrodes.

14. The method according to claim 13, wherein, forming, by a single patterning process, connecting lines which connect the electrode segments of the third electrode specifically comprises:
   forming, by a single patterning process, a gate and the connecting lines which connect the electrode segments of the third electrode.

15. The method according to claim 13, wherein, forming, by a single patterning process, an electrode connecting layer specifically comprises: forming, by a single patterning process, a pixel electrode and the electrode connecting layer, a projection of the electrode connecting layer on the base substrate intersecting with the third electrodes.

16. The method according to claim 13, wherein, before forming the electrode connecting layer, the method further comprises:
   forming a protection layer on formed thin film transistor, and forming through holes corresponding to the electrode segments of the first electrodes in the protection layer.

* * * * *